United States Patent [19]

Bishoff et al.

[11] Patent Number: 4,470,647
[45] Date of Patent: Sep. 11, 1984

[54] INTERFITTING AND REMOVABLE MODULAR STORAGE UNITS INCLUDING CONNECTORS FORMING PART OF A UNIT AS WELL AS SLIDING SUPPORT FOR ADJACENT UNITS

[75] Inventors: Mark L. Bishoff, 10331 Wilde Lake Ter., Columbia, Md. 21044; George Nelson, New York, N.Y.; Daniel J. Lewis, Ridgewood, N.J.

[73] Assignee: Mark L. Bishoff, Columbia, Md.

[21] Appl. No.: 383,702

[22] Filed: Jun. 1, 1982

[51] Int. Cl.³ ............................................. A47B 87/00
[52] U.S. Cl. .................................... 312/111; 312/108; 312/140; 312/236; 312/265
[58] Field of Search ..................... 211/182, 183, 189; 52/18, 27, 282, 285; 229/49, 37 R; 217/12 A, 65; 220/445, 23.4, 23.6, 80, 84, 91; 312/111, 140, 258, 259, 260, 261; 403/231, 205, 403

[56] References Cited

U.S. PATENT DOCUMENTS

| | | | |
|---|---|---|---|
| 1,071,072 | 8/1913 | Mengel | 217/12 A |
| 1,966,875 | 7/1934 | Tufts | 217/12 A |
| 2,962,334 | 11/1960 | Dutmers | 312/265 |
| 3,362,739 | 1/1968 | Staeger et al. | 52/285 |
| 4,192,562 | 3/1980 | Bishoff et al. | 220/23.6 |

FOREIGN PATENT DOCUMENTS

| | | | |
|---|---|---|---|
| 1140212 | 11/1962 | Fed. Rep. of Germany | 312/258 |
| 594543 | 11/1947 | United Kingdom | 217/65 |

Primary Examiner—James T. McCall
Assistant Examiner—Joseph Falk
Attorney, Agent, or Firm—Berman, Aisenberg & Platt

[57] ABSTRACT

A set of identical connectors are secured to a plurality of rectangular panels to form a tubular or box-like storage unit with the connectors forming parallel longitudinal edges thereof. The connectors each have a longitudinal T-shaped rib and a T-shaped, longitudinal recess, capable of slideably receiving the rib of an adjacent storage unit, so that a plurality of units may be arranged and stacked to form a self sustaining structure from which one or more storage units may be slideably removed without disturbance to the remaining structure and units. In one embodiment a connector and a panel are formed integrally as a one-piece unit.

30 Claims, 11 Drawing Figures

INTERFITTING AND REMOVABLE MODULAR STORAGE UNITS INCLUDING CONNECTORS FORMING PART OF A UNIT AS WELL AS SLIDING SUPPORT FOR ADJACENT UNITS

BACKGROUND OF THE INVENTION

1. Field of the Invention

The invention relates to a modular storage unit of box-like shape formed of flat panels fastened along their longitudinal edges by a set of identical connectors each having a longitudinal rib and a longitudinal recess. The rib of one connector slideably interfits with the recess of another connector so that a plurality of units may be arranged in a self supporting stack and one or more units may be slideably shifted or removed from the stack without disturbance to and without collapse of the remaining stacked units.

2. The Prior Art

Perhaps the closest prior art structure to the present invention is disclosed in the U.S. patent, of which Bishoff is coinventor, No. 4,192,562, issued Mar. 11, 1980. In this patent each storage unit is a three dimensioned open frame formed by a set of four longitudinal, four vertical and four cross bars, each frame being capable of being closed to a box-like structure by addition of flat panels or boxes. The longitudinal bars are provided with a rib and a recess that enable adjacent units to be slideably interfitted, as well as additional notches for receiving and fastening the cross bars and the panels. The present invention is an improvement thereon which greatly simplifies the structure and greatly reduces the cost of fabricating the device. This is accomplished by eliminating the four vertical and four cross bars and reducing the structure to a plurality of rigid panels, which may be identical, and a plurality of identical connectors which fasten the panels at right angles to one another along their longitudinal edges, and also slideably interfit with connectors of adjacent units. The connectors are also simplified in structure to comprise elongated angle members requiring less material and provided with a complementary rib and recess for interfitting, and with U-shaped seats for frictionally fastening the panels, each connector being structured to be inexpensively extruded in its essential and final shape and cross sectional size.

U.S. Pat. No. 3,836,218 issued to Alfred Jean Hallal on Sept. 17, 1974, has a degree of similarity to the present invention in utilizing elongated horizontal connectors to mate with cubical box units for holding the latter in stacked configurations. The patent connectors each comprise four T-shaped ribs arranged in a cross and the box units have T-shaped grooves formed in each wall surface to slideably receive a connector rib. The patent connectors do not function to fasten the box panels together as in the present invention. Instead the box unit of the patent must be assembled and expensively machined with mating T-shaped grooves to receive the connectors. The present invention utilizes inexpensive flat panels and the connectors not only fasten the panels perpendicular to one another but permit each unit to be slideably removed from a stack.

U.S. Pat. No. 3,491,896 issued to T. H. Crary on Jan. 27, 1970, provides a rib and a recess at each of opposite sides of flat panels to mate with those of other panels to form box-like units held in stacked configuration. Thus the patentee does not use separate connectors to fasten the panels together, nor are his units after stacking intended to be normally slideable with respect to one another. Where the patentee suggests use of separate bars with ribs and recesses, they are utilized to rigidify the structure and conceal the tenons and grooves at the edges of assembled panels. A somewhat similar structure to that of Crary is disclosed in the Giancarlo Piretti U.S. Pat. No. 3,722,704 issued on Mar. 27, 1973. Piretti also utilizes flat, rigid panels having a coupling rib and groove formed at each of opposite sides, the coupling elements being provided in edges angled at 45° to the plane of the panel.

The U.S. Pat. No. 4,243,279 issued to Peter Ackeret on Jan. 6, 1981, like the Hallal patent briefly described above, discloses rectangular storage units having mating sliding configurations at their sides and at their top and bottom surfaces. The patentee does not use connectors for fastening panels together in box form. Upper and lower plates with complementary interfitting ribs and grooves are used by the patentee to hold a vertical stack of storage units and to connect them to an adjacent stack. U.s. Pat. No. 3,999,818 issued Dec. 28, 1976 to Martin M. Schankler also discloses an interlocking system of cartridges or boxes in which the interfitting ribs and recesses are molded in the walls of the boxes, no separate connectors being used to fasten the walls of the boxes together.

The Patent U.S. No. 4,045,104 issued to Clinton B. Peterson on Aug. 30, 1977 does utilize connectors having U-shaped slots to fasten panels into a box shape, but there are no complementary ribs and recesses on the connectors for sliding interfit with an adjacent box. A similar diasadvantage lies with the connectors disclosed by Johannes M. Verholt in U.S. Pat. No. 3,820,299 issued June 28, 1974. A further disadvantage of the dozen or so variations of connector design illustrated in the last named patent is that each connector has short inturned hook flanges, which require the machining, or otherwise forming, of mating grooves in the panels secured to the connectors.

In the present invention one embodiment forms a connector and a panel integrally as a one-piece member but the combined connector panel still functions not only to fasten the member perpendicularly to a second member but also to slideably link a storage unit comprising the said two members to another storage unit formed of similar members. None of the patents mentioned above disclose or teach this dual function.

SUMMARY OF THE INVENTION

The present invention overcomes the defects and disadvantages of the patented art, as briefly described above, by providing a storage system in which the individual units are formed of panels fastened together in perpendicular relation by identical connectors, each having a complementary rib and recess, and which slideably interfit with similar connectors on adjacent units.

From the above it should be noted that a primary object of the invention is to provide a simple connector member having the dual function of first fastening a pair of panels together to form the sides of a storage unit, and second, slideably interfitting with a similar connector on an adjacent unit to form a stack, or wall of modular units.

Another important object of the invention is to provide a complementary rib and recess on the connector member which fasten the panels to form the storage unit walls and which rib and recess interfit to allow stacking of the units in a wall structure, the ribs and recesses of adjacent units slideably interfitting to enable drawer-like operation of the units and complete removal of some of the units without collapse of or disturbance to the remaining units of the wall structure.

Still another important object of the invention is to provide a modular storage unit construction in which one or more panels can be utilized to partially or completely enclose a cubic space and form a storage unit, thus enabling variation of a stacked wall of units to include not only complete boxes, but open ended tubes, drawers, partitions and shelves, and enabling the wall to function as an attractive and decorative piece of furniture, room divider, or storage partition.

Yet another important object of the invention is to provide a modular storage construction requiring only two parts, panels and connectors, although other parts such as handles, hinges and the like may be added if desired.

It is a still further object of the invention to provide a modular storage construction in which the component parts are identical and therefore interchangeable, although panels of varying area or configuration, and connectors of varying length may be used if desired.

Yet another object of the invention is to provide a modular storage unit which may be readily assembled and disassembled, and such that these operations may be performed without the use of tools.

Another important object of the invention is to provide a modular storage construction, having the above described characteristics, which is inexpensive to produce and easy to assemble and use, the storage units being preferably formed of plastic, wood, metal or inexpensive fibreboard panels and the connectors being extruded inexpensively of plastic or metal material.

Still another important object of the invention is to provide a modular storage construction, having the above described characteristics, in which a connector and a panel are integrated to form a one-piece structure.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understand from the following description of specific embodiments when read in connection with the accompanying drawings, wherein like reference characters indicate like parts throughout the several Figures, and in which:

DESCRIPTION OF THE PREFERRED EMBODIMENTS

Figure 1:
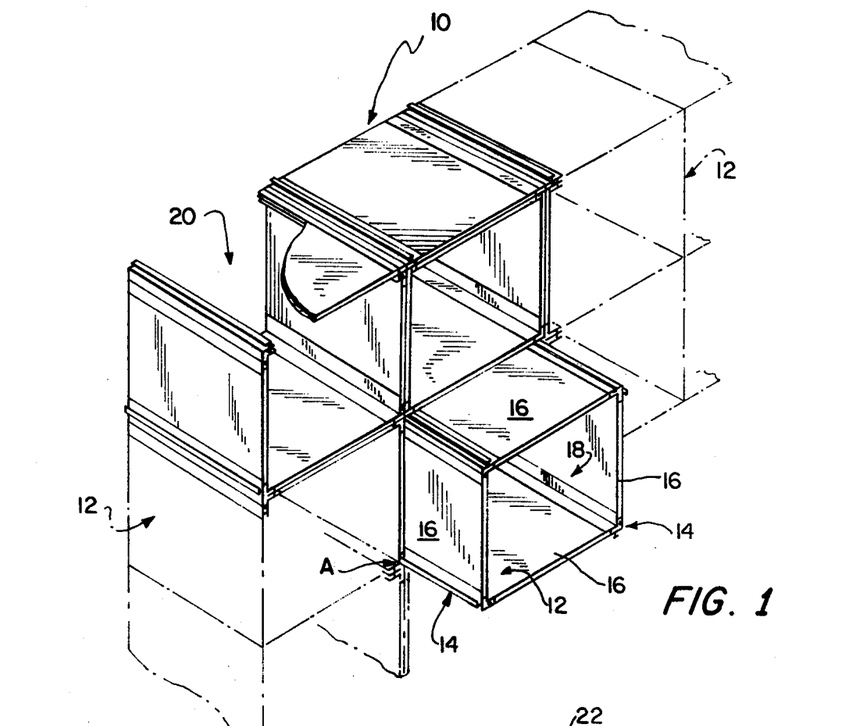
FIG. 1 is a perspective view illustrating a wall structure formed of modular, tubular storage units constructed in accordance with the invention.
Figure 2:
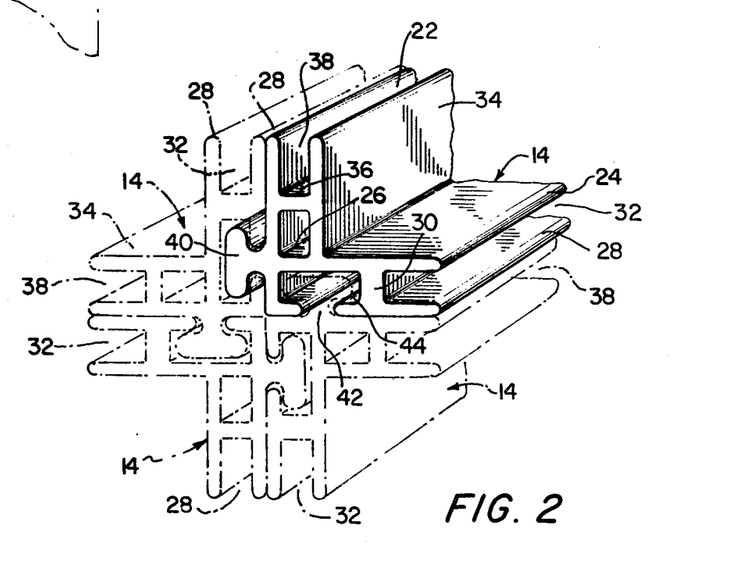
FIG. 2 is an elongated perspective view of a connector member, for fastening walls of a storage unit, shown in solid lines and broken away at an intermediate portion of its length and in interfitted sliding relation with three identical connectors forming the adjacent corner edges of adjacent storage units, (not shown), the three interfitted connectors being shown in broken lines.
Figure 3:
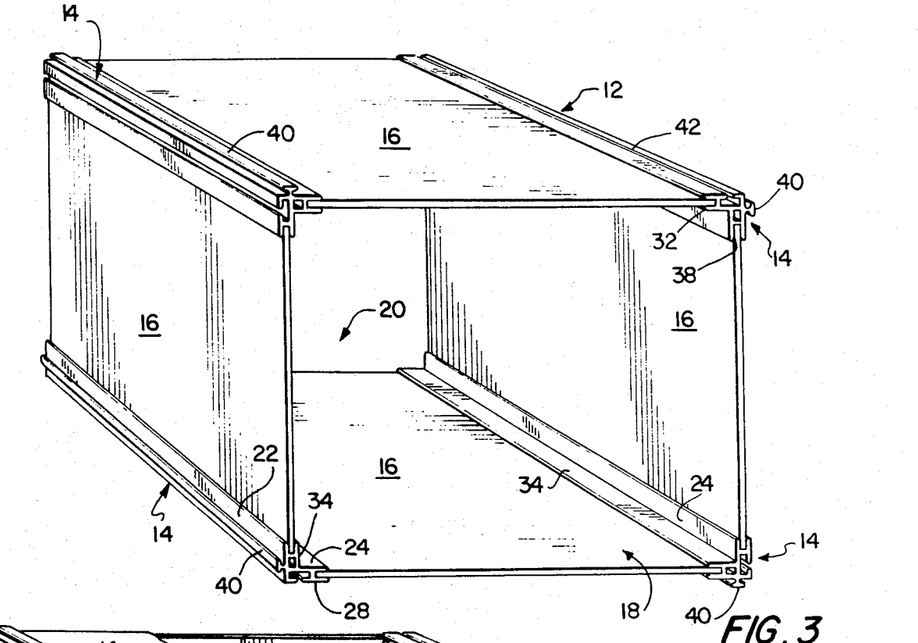
FIG. 3 is an enlarged perspective view of one of the storage units forming the wall of FIG. 1.

Referring more particularly to the drawings, FIG. 1 illustrates a storage or partition wall 10, exemplifying one preferred embodiment of the invention, formed of self sustaining, slideably interfitted, tubular storage units 12. The construction of each unit 12 is best seen in FIG. 3, while the construction of the unit connector elements 14 is best seen in FIG. 2.

Each modular storage unit 12 comprises four rectangular, rigid panels 16 fastened together in perpendicular relation by four connectors 14 to form a tubular receptacle having top, bottom and side walls, but open at the front and rear, 18 and 20 respectively. The four panels 16 may be identical in size and shape and thus interchangeable, and are preferably formed of an inexpensive, rigid material such as plastic, hardboard, or even fibreboard, or cardboard of reenforced internal construction, so as to retain the shape of the unit when articles or materials are stored therein. Other and more expensive materials such as metal or wood, obviously may be used to form the panels.

The four connectors 14 are also identical and interchangeable. Each connector is an elongated angle bar having a vertical flange 22 and a horizontal flange 24 which intersect in the line 26 extending longitudinally of the bar for its full length, which desirably equals the lengths of the panels 16. The flange intersection line 26 is above the bottom edge of vertical flange 22. A second horizontal flange 28 extends from the bottom edge of vertical flange 22 in the same direction as horizontal flange 24 and is connected to the latter by a short wall 30, perpendicular to both and spaced inwardly from the outer edges of flanges 24, 28. These outer edges and wall 30 form an elongated slot 32, of U-shaped crosssection, which receives the edge of one of the panels 16 with a tight frictional fit, or adhesive, to hold the panel in horizontal position. Flanges 24 and 28 together with wall 30 constitute an arm which is horizontally H-shaped in section.

A second vertical flange 34 extends upwardly from flange 24 and is connected to flange 22 by a short horizontal wall 36, spaced inwardly from the upper edges of flanges 22 and 34. Thus wall 36 with the edges of flanges 22 and 34 form an upwardly directed, elongated slot 38, of U-shaped crossection, which seats and frictionally or with adhesive holds another panel 16 vertically in relation to the first panel held in slot 28. Flanges 34 and 22 together with wall 36 constitute an arm which is vertically H-shaped in section.

Each connector 14 further comprises a longitudinal rib 40, of T-shaped crossection, extending outwardly of the angle connector member flange 22 at the level of flange 24 preferably for the full length of connector 14. An elongated slit 42 parallel to the bottom edge of flange 22 extends the length of flange 28 and together with space 44 forms an elongated recess having a T-shape in crossection with slit 42 forming the stem of the T. The recess 42, 44 is sized slightly larger than the rib 40 so as to slideably receive the rib of another connector and thus interlock with the corner of another storage unit in forming a portion of the wall 10 of FIG. 1. In this way the connectors provide both interlocking support of adjacent storage units in the wall 10, and fastening of walls of a unit while permitting sliding movement for drawerlike access, or even complete removal of one or more units from wall 10, without collapse or disturbance of the wall.

The connectors 14 are preferably extruded lengths of inexpensive plastic or metal material which are cut to the desired length to fit the panels 16. As apparent from FIG. 2 the described connector 14 shown in solid lines interfits with a second identical connector rotated 90° counter clockwise about the longitudinal line of flange intersection 26 as an axis, the second connector being shown in broken lines. The second connector is shown interfitted with a third connector rotated 90° further in the same direction and shown in broken lines, while the third connector interfits with a fourth, broken line, connector rotated 90° further. Thus FIG. 2 illustrates the interfitting arrangement of four connectors at the common intersection of four adjacent storage units in wall 10, as for example the corner labeled A in FIG. 1. This also explains the manner in which any one of four identical connectors 14 may be used at any one of the corners of unit 12 to hold the wall panels 16 in proper relation, it being merely necessary to rotate a connector about its longitudinal axis to orient the rib 40 outwardly of the unit with the panel receiving recesses 28, 38 extending in the proper directions, as shown in FIG. 3. Thus a connector 14 when placed to form the upper right edge of unit 12, FIG. 3 has rib 40 extending to the right. An identical connector turned 90° counter clockwise and fastened to panels 16 at the upper left edge of the unit has the rib 40 extending upwardly. Similarly an identical connector turned an additional 90° and fastened at the bottom left edge of the unit has the rib 40 extending to the left. Turning the fourth connector an additional 90° in the same direction enables it to be fastened to the unit panels with rib 40 extending downwardly. In this way, one rib 40 of each of four adjacent units 12 interfits with a recess 42, 44 of an adjacent unit in a stack or wall of units 10. It should be noted since the rib 40 may be faced in any direction dependant upon the amount of rotation, the connectors can be utilized with the ribs 40 faced in different directions than illustrated in FIGS. 1 and 3. If, for example, it became important to have a flat bottom on the storage unit, two connectors rotated 180° relative to one another about their own axes and with one connector reversed end for end could be used at the bottom of the unit and their ribs would project outwardly to the left and right.

Each storage unit is illustrated in FIGS. 1 and 3 as being a tubular box open at the front and rear. The four panels 16 press fitted into the four connectors 14 are rigid and maintain the tubular shape of the unit 12 so that files, file folders, books, bric a brac or other suitable objects may be placed within the unit for storage or display. If desired, or if necessary for added strength or permanence, the edges of the panels 16 may be glued or cemented in the slots 32, 38 of the connectors. Screws, rivets, snaps or other types of fasteners may be used and the panels 16 may be secured to the connector flanges other than in the slots 32, 38. The sizes, shapes and lengths of the panels and connectors may obviously be varied. Many other variations are also obviously possible. For example, the top panel 16 may be omitted so that the unit would become an open top three sided tray. Front and rear panels may be added by fastening, gluing, or the like, to the edges of the side and bottom panels and the unit would be converted to an open top drawer.

The storage units 12 may be factory asssembled, or fabricated and sold to individuals as kits for home assembly. In the latter instance, each storage unit kit would constitute merely four identical connectors and four panels.

To assemble a storage unit 12 it is merely necessary to press fit two panels 16 into the slots 38, 32 of a connector 14 arranged with its rib 40 extending downwardly so that the connector forms the lower right corner of the unit 12 as pictured in FIG. 3. A second connector is then placed with its rib 40 projecting to the right and its slot 38 downward and press fitted onto the upper edge of the vertical panel. A horizontal top panel 16 is then pressed into slot 38 of the upper right connector. A third connector oriented with its rib 40 extending upwardly is press fitted to the left edge of the upper panel. Another panel 16 forming the left wall of the unit is fastened to the downturned slot 32 of the third connector. The fourth connector is then pressed onto the bottom edge of the left wall 16 and the left edge of the bottom panel. The term "press fit" as used herein is intended to include pressing the panel at right angle into the connector or pressing the panel longitudinally of the connector by sliding endwise into slot 32 or 38. Obviously the described steps may be reversed and the connector "press fitted" onto the panels.

Any number of units 12 may be assembled in the manner described above and interfitted to form a storage wall or structure such as shown in FIG. 1. When thus arranged, with the ribs 40 slideably engaged in the recesses 42, 44 of adjacent connectors, each unit may be slid forwardly or rearwardly in the manner of a drawer. Because of the interlocking of the ribs and recesses, any one, several or, even all of the units in any vertical line can be completely removed to another location without toppling of the remaining units. This is an important advantage since it permits removal and return or replacement of storage units without the need for handling, or rearranging, the other remaining units.

Figure 4:
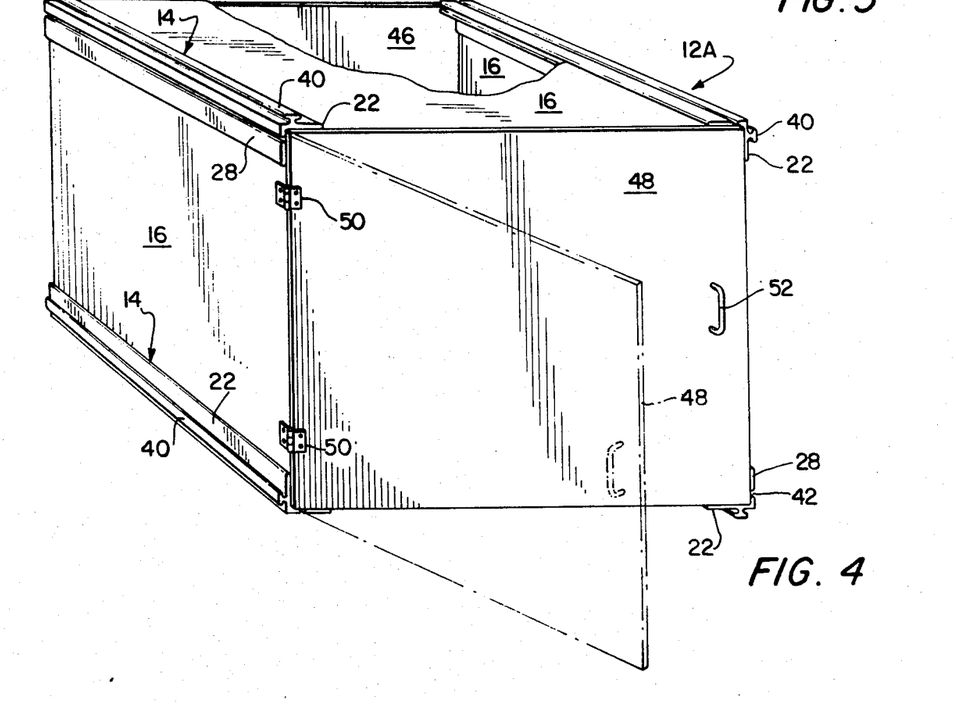
FIG. 4 is a perspective view similar to FIG. 3 but showing a modified storage unit having a rear wall and a hinged front wall.

The modified storage unit 12A shown in FIG. 4 is in all respects identical with unit 12 of FIG. 3 except that a rear wall 46 and a front wall 48 have been added. The rear wall 46 is fastened in any suitable manner, not shown, as by cementing to the rear edges of the side, top and bottom walls 16, to the rear edges of the connectors 14, or by screws, pins, snaps, clamps or other types of fasteners. Rigid closure panel 48, hinged as at 50 to the forward edge of the left side wall 16, is provided with a handle 52 and a latch, hook or lock (not shown) for retaining the door closure 48 in closed position as shown in solid lines in FIG. 4. It will be noted that door 48 swings leftward to open as illustrated in broken lines. However if it is desired to swing the door upward to open, the unit need only be turned 90° clockwise so that hinges 50, 50 are at the top, The unit may be turned 90° clockwise in two further steps to allow the door to swing open toward the right and downwardly respectively, whichever is desired. Furthermore, if the panels 16, 46 and 48 are made squares of equal size the unit may be slideably interfitted in a wall of identical units, such as 10, FIG. 1, with the door 48 swinging to open in any one of the four directions as desired.

Figures 5, 5A, 5B, 6:
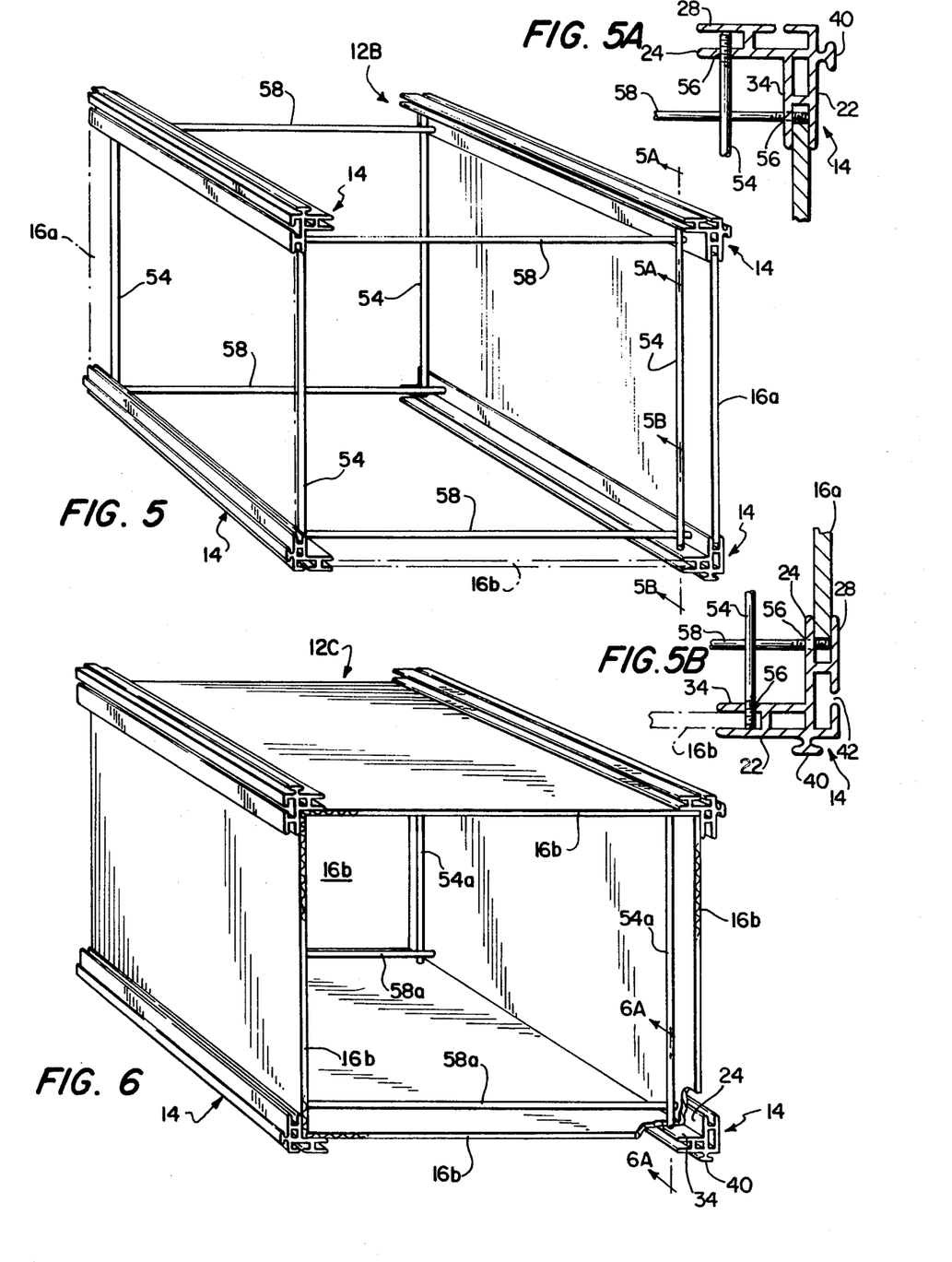
FIG. 5 is a perspective view similar to FIGS. 3 and 4 but showing another and different embodiment of the invention.
FIG. 5A and 5B are fragmentary, detailed, sectional views taken through lines 5A—5A and 5B—5B respectively of FIG. 5.
FIG. 6 is a perspective front view similar to FIGS. 3, 4, and 5 but showing still another embodiment of the storage unit.

A modified storage unit 12B is illustrated in FIGS. 5, 5A and 5B, and is identical with unit 12 except as will be explained. Four connectors 14 are again used, but only two side wall panels 16a and a bottom panel 16b are fastened to the connectors. Panels 16a and 16b are formed of less rigid, weaker or more flexible material than panels 16, for example, heavy paper, thin cardboard, reenforced cloth, etc. The weaker or more flexible panels are therefore unable to maintain the proper configuration of the unit 12B under all conditions of storage use, or load. Accordingly four, rigid, vertical spacer rods 54 are disposed adjacent the side panels 16a near their front and rear edges and serve to hold the upper and lower connectors suitably spaced apart. Conveniently for easy assembly the rods may be given right and left hand threads (as shown in FIGS. 5A and 5B) at their opposite ends and are threaded into threaded openings 56, 56 in the flanges 24, 34 of the upper and lower connectors 14 respectively. Similarly four rigid, horizontal spacer rods 58 are disposed near the front and rear, upper and lower edges of the storage unit to hold the left and right connectors suitably spaced apart. Rods 58 are also oppositely threaded at their ends and screwed into the threaded openings 56 in flanges 24 and 34 of the appropriate right and left connectors. It should thus be apparent that the rods 54 and 58 strengthen and rigidify the storage unit when weaker more flexible wall panels are to be used or are to be omitted entirely if desired. In assembling the unit 12B the rods 54, 58 may be fastened by threading into the connectors first and the panels 16a, 16b inserted later, or these steps may be reversed. If the storage unit 12B is formed as a cube, the eight rods are made identical.

Figures 6A, 7, 8:
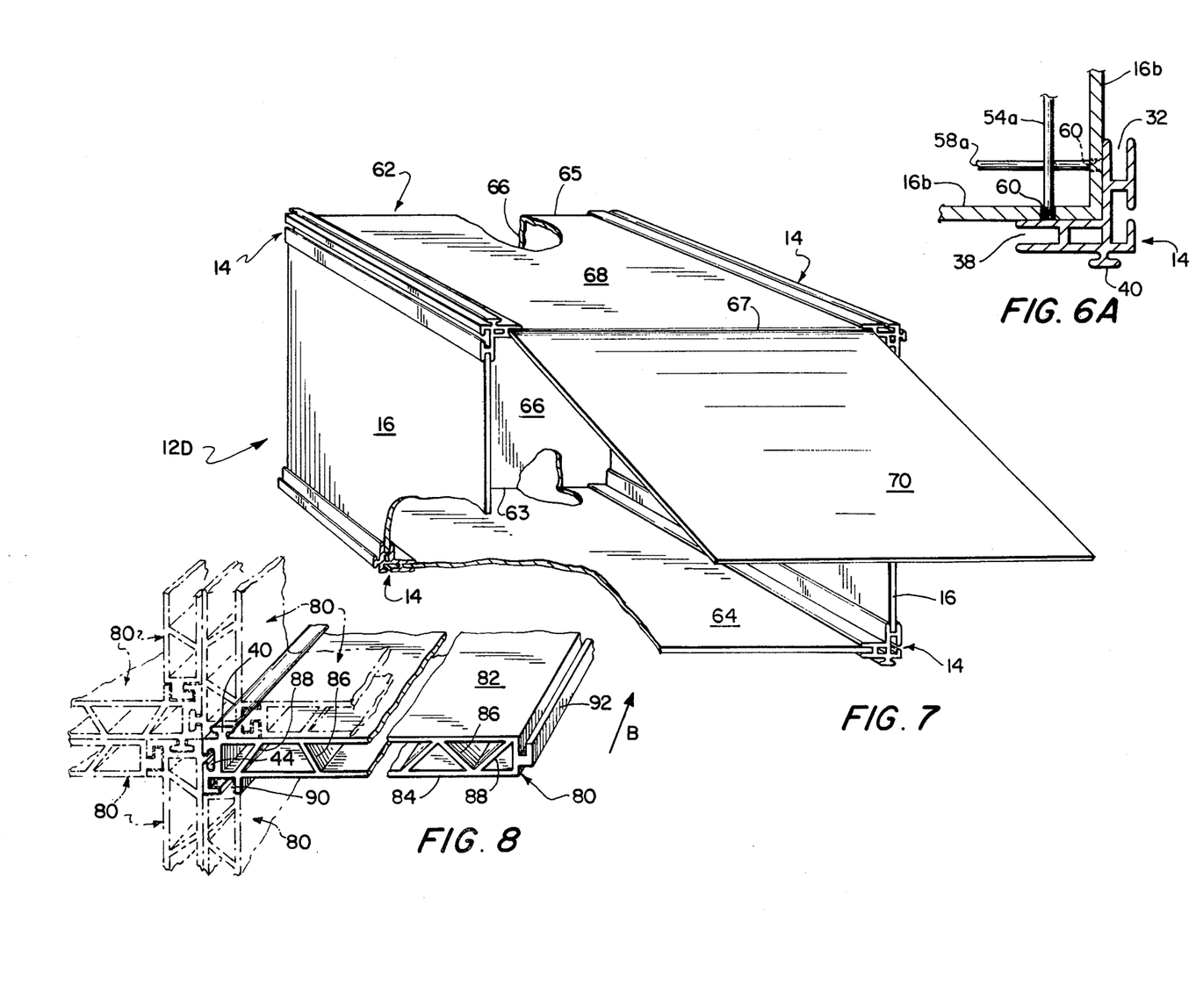
FIG. 6A is a fragmentary, detailed, sectional view taken along lines 6A—6A of FIG. 6.
FIG. 7 is a front perspective view similar to FIGS. 3, 4, 5, and 6 but showing yet another embodiment of the storage unit.
FIG. 8 is a perspective view similar to FIG. 2, but showing still another embodiment in which the tubular storage units are formed of four integral one-piece members comprising a connector and a panel and in which part of such a one-piece panel member is shown in solid lines and some additional members interfitted therewith to form a storage unit of interlinked adjacent units are fragmentarily shown in broken lines.

The modified storage unit 12C, FIGS. 6 and 6A, is similar to unit 12B differing in the following respects. A single corrugated fibreboard strip, having top, bottom, and side wall portions, 16b, defined by fold lines, is, at its corners, cemented or otherwise adhered to the inner surfaces of flanges 24, 34 of the connectors instead of being secured within the slots 32, 38. Openings 60, FIG. 6A, are provided at suitable locations near the edges of the panels 16b to seat and hold the unthreaded ends of rigid spacer rods 54a, 58a. Unit 12C is assembled and used, as well as disassembled, in a manner similar to that as explained above for unit 12B.

Modified storage unit 12D illustrated in FIG. 7 is similar to unit 12, FIG. 3 but differs in the following respects. Only rigid side panels 16, 16 are utilized and four connectors 14 as in unit 12A. The remaining surfaces are formed of a single strip of semirigid fibreboard 62 with three transverse fold lines 63, 65 and 67 dividing the strip into a bottom panel 64, a rear panel 66, a top panel 68 and front panel 70. The crease or fold line 67 acts as a hinge to permit swinging open of the front panel 70 between unit opening and closing conditions.

Storage unit 12D may be assembled and used in the same manner as explained for units 12 and 12A, except possibly that it is desirable to attach the four connectors by moving them transversely against the side edges of the strip wall portions 64 and 68 to fasten the edges in slots 32, 38. This may be done before or after the connectors have been fastened onto the two side panels 16.

FIG. 8 illustrates still another embodiment of the invention in which a connector and panel are integrated to form a one-piece member. Such a member is generally referenced 80 and comprises a flat, hollow, rectangular plate having spaced, parallel face walls 82 and 84, preferably reenforced and rigidified by a plurality of angled, internal connecting walls 86, 88. At one edge of member 80 is formed the longitudinal recess 44, while the complementary rib 40 protrudes outwardly from wall 82 adjacent said edge. This rib and recess correspond to the T-shaped parts of connector 14, FIG. 2. A longitudinal recess 90 is formed to extend along the panel adjacent the above named edge and this is complementary to and sized to slideably and frictionally receive a longitudinal rib 92 of another panel member to hold the latter perpendicular to the former. Rib 92 is formed along and to protrude from the edge opposite the edge of the panel member 80 which includes recess 44. Recess 90 and Rib 92 are shown as having L-shaped cross sections.

Although panel member 80 may be integrated from separate parts it is preferred to extrude the complete panel longitudinally in the direction of arrow B, FIG. 8 using a plastic or light weight metal as the material thereof.

In use of panel member 80, it should be apparent that rib 92 of one panel may be slideably interfitted in recess 90 of another panel to hold the two perpendicular to one another and four panels 80 may be assembled to form an open end tubular sleeve such as illustrated at 12, FIG. 3. This storage unit may be rigidified and rendered more permanent by cementing the ribs 92 in the recesses 90. A plurality of units so assembled may then be stacked by slideably interfitting the units by engagement of protruding ribs 40 in the recess 44 of adjacent units in the same manner as described for the storage units 12 and the other modifications previously described.

Although certain specific embodiments of the invention have been shown and described, it should be obvious that many modifications thereof are possible. The invention, therefore, is not intended to be restricted to the exact showing of the drawings and description thereof, but is considered to include reasonable and obvious equivalents.

What is claimed is:

1. A modular storage unit kit, comprising a set of four longitudinal connectors only and a plurality of rigid rectangular panels adapted to be secured together in a mutually supporting manner to form an open ended tubular storage unit without the need for other parts such as corner posts or crossbars, each of said connectors comprising an elongated angle member having a generally vertical flange and a generally horizontal flange, securing means on each of said flanges adapted to fasten to an edge of one of said panels, a longitudinal rib extending from the vertical flange outwardly of the angle member, and a longitudinal recess extending along the horizontal flange outwardly of the angle member, said recess being of a size and shape to slideably receive the rib of an adjacent and similar connector of a different storage unit, so that a plurality of assembled units may be fitted together with their ribs and recesses in interlocked fashion to form a self sustaining structure having slideable, removable units, and whereby each connector has the dual functions of fastening the unit panels and slideably interconnecting with an adjacent and similar unit.

2. A modular storage unit kit according to claim 1 wherein each of said connectors has the same cross sectional configuration, whereby the same connector may be used to form any one of the longitudinal edges of the storage unit by turning the connector in 90° steps about the intersection of its flanges as an axis.

3. A modular storage unit kit according to claim 1, wherein said ribs and recesses each have uniform T-shaped cross sections.

4. A modular storage unit kit according to claim 1, wherein said securing means is a U-shaped slot adapted to frictionally receive and fasten a panel.

5. A modular storage unit kit according to claim 4 wherein each of said U-shaped slots is formed between a parallel flange and one of said horizontal and vertical flanges and a short perpendicular wall connecting the parallel flanges and defining the base of the said U-shaped slot.

6. A modular storage unit kit according to claim 5 wherein said horizontal recess in each of said connectors is formed between said horizontal flange and the said parallel wall connected thereto, there being an elongated slit in the parallel wall defining the stem of the T-shaped recess.

7. A connector having the dual functions of (1) holding a pair of panels at right angle to one another so as to form part of a tubular storage unit requiring no bracing parts at its open ends when the panels are rigid and (2) also slideably interconnecting with another and similar connector forming part of a different and similar storage unit, said connector comprising an elongated angle member having first and second arms perpendicular to one another and intersecting in a line extending longitudinally of the connector, the portions of each said arms outwardly of said line of intersection having securing means adapted to fasten to an edge of one of said panels, a longitudinal rib extending from said first arm outwardly thereof, and a longitudinal recess formed in said second arm, said recess being of a size and shape to slideably receive the rib of another adjacent and similar connector.

8. A connector according to claim 7 wherein said rib and recess each have a uniform T-shaped cross section.

9. A connector according to claim 7 wherein said securing means is a U-shaped slot adapted to frictionally receive and secure a panel.

10. A connector according to claim 9, wherein said first arm has a vertically disposed H-shape in section and said second arm has a horizontally disposed H-shape in section, the said U-shaped slots defining said frictional securing means being formed by the crossbar and outer portions of said H-shape sections, and said longitudinal recess being formed by the base portion of the H-shape of the second arm, there being a longitudinal slit formed in the base portion of the H-shape of the second arm leading into said recess and permitting entry of the rib of said other connector.

11. A connector according to claim 10, wherein the cross section of said connector is uniform for its entire length permitting formation of the connector by an extrusion process.

12. A connector according to claim (10) 7 wherein openings are provided in said first and second arms to receive and secure the ends of rigid spacer rods that may extend between oppositely positioned pairs of connectors when the panels are flexible.

13. A connector according to claim 10 wherein openings are provided in both legs of said H-sections of said first and second arms to receive and secure the end of a rigid spacer rod that may extend between oppositely positioned pairs of connectors.

14. A connector according to claim 13 wherein said openings in both legs of said H-sections are aligned with each other and are formed with threads to receive threaded rod ends.

15. A modular storage unit, comprising four longitudinal connectors securing the edges of rectangular panels to form a tubular enclosure open at its ends, said connectors and panels being mutually supporting without the need for any other parts such as vertical corner posts or crossbars at the open ends of the said storage unit, each of said connectors being an elongated angle member having a pair of perpendicular flanges intersecting in a longitudinal line, securing means on each flange for fastening an edge of one of said panels, a longitudinal rib extending from one flange and a longitudinal recess extending from the other flange outwardly of each angle member, and said recess being of a size and shape to slideably receive the rib of an adjacent and similar connector of a different storage unit so that a plurality of units may be fitted together with their ribs and recesses in interlocked fashion to form a self sustaining structure having slideable, removable units, and whereby each connector has the dual functions of fastening the unit panels and slideably interconnecting with an adjacent and similar unit.

16. A modular storage unit according to claim 15, wherein said connector ribs and recesses each have uniform T-shaped cross sections.

17. A modular storage unit according to claim 16, wherein each said connector securing means is a U-shaped slot frictionally receiving and holding a panel.

18. A modular storage unit according to claim 17 wherein said connector U-shaped slots are each formed between one of said first pair of flanges and one of a second pair of perpendicular flanges parallel to the first pair, there being a short perpendicular wall connecting each parallel flange of the second pair to the corresponding flange of the first pair to define the base of the said U-shaped slot.

19. A modular storage unit according to claim 18, wherein said longitudinal recess of each connector is formed between one flange of said first pair of flanges and the flange of the second pair parallel thereto, there being an elongated longitudinal slit in said parallel flange of the second pair defining the stem of said T-shaped recess.

20. A self sustaining structure of modular units, comprising a plurality of tubular storage units interfitted with one another, each unit being formed of four longitudinal connectors securing the edges of a plurality of rectangular panels, the connectors and panels of each said units being mutually supporting without the need for other parts such as corner posts or crossbars at the open ends of the unit, each of said connectors being an elongated angle member having a pair of perpendicular flanges intersecting in a longitudinal line, securing means on each flange fastening an edge of one of said panels, a longitudinal rib and a longitudinal recess extending from the flanges outwardly of the angle member, and said recesses of one unit slideably receiving the ribs of adjacent units to hold the storage units in interlocked fashion while permitting the units to be individually slid partially out of the structure or to be removed from the structure without disturbance to and without collapse of the remaining units, and whereby each connector has the dual functions of fastening the unit panels and slideably interconnecting with an adjacent and similar unit.

21. A self sustaining structure according to claim 20 wherein said connector ribs and recesses each have uniform T-shaped cross sections.

22. A self sustaining structure according to claim 21 wherein each said connector securing means comprises a U-shaped slot frictionally receiving and holding a panel.

23. A self-sustaining structure according to claim 22 wherein said connector U-shaped slots are each formed between one of said first pair of flanges and the parallel flange of a second pair of perpendicular flanges parallel to the first pair, there being a short perpendicular wall connecting each parallel flange of the second pair to the corresponding flange of the first pair of define the base of said U-shaped slot.

24. A self-sustaining structure of modular units according to claim 23, wherein said longitudinal recess of each connector is formed between one flange of said first pair of flanges and the flange of the second pair parallel thereto, there being an elongated longitudinal slit in said parallel flange of the second pair defining the stem of said T-shaped recess.

25. An integral, one-piece panel and connector member adapted to be secured to similar members to form an open ended, tubular, storage unit with said members forming the sides thereof in perpendicular relation to one another, comprising a rectangular panel having a first longitudinal recess formed along one edge, a second longitudinal recess formed along one face of the panel adjacent said edge, a first longitudinal rib projecting from the opposite face of the panel, and a second longitudinal rib projecting from the opposite edge of the panel, said second rib and recess being complementary to one another and sized so that the second rib of another and similar member will slidably interfit the second recess of said member and hold the two members at right angle to one another, and said first rib and first recess being complementary in shape and sized so that the said first rib of another similar member forming part of another storage unit will slideably interfit with the first recess of said member and enable a plurality of storage units to be fitted together to form a self sustaining structure having slideable, removable units.

26. A combination panel and connector member according to claim 25, wherein said member is extruded as one piece and said panel is hollow having spaced, parallel flat walls forming said opposite faces, and a plurality of reenforcing and rigidifying walls inside the hollow panel connecting said walls.

27. A combination panel and connector member according to claim 26, wherein said first rib and recess are T-shaped in cross section and said second rib and recess are L-shaped in cross section.

28. A modular storage unit according to claim 15, wherein said four connectors are disposed in spaced parallel relation to form the corner edges of said open ended tubular enclosure, said panels comprising a continuous strip panel having fold lines transversely thereacross to define the walls of the tubular enclosure, the edges of two opposite ones of said walls being fastened to opposite pairs of said connectors.

29. A modular storage unit according to claim 28, wherein said continuous strip panel defines bottom, back, top and front walls of the units, said front wall being hingedly fastened to the front edge of one of said top and bottom walls by one of said fold lines.

30. A modular storage unit according to claim 19, wherein said panels comprise a continuous strip panel having fold lines and which when folded forms said tubular enclosure, said four elongated connectors being secured to the corner edges of said tubular enclosure and parallel to each other by frictional fit of some edges of said strip panel in said U-shaped slots of the connectors.

* * * * *